United States Patent
Schuetz et al.

(10) Patent No.: US 11,440,742 B2
(45) Date of Patent: Sep. 13, 2022

(54) CONVEYING AND METERING DEVICE

(71) Applicant: Schenck Process Europe GmbH, Darmstadt (DE)

(72) Inventors: Andreas Schuetz, Bischofsheim (DE); Stefan Goetz, Seeheim-Jugenheim (DE)

(73) Assignee: Schenck Process Europe GmbH, Darmstadt (DE)

( * ) Notice: Subject to any disclaimer, the term of this patent is extended or adjusted under 35 U.S.C. 154(b) by 595 days.

(21) Appl. No.: 16/537,060

(22) Filed: Aug. 9, 2019

(65) Prior Publication Data

US 2019/0359430 A1 Nov. 28, 2019

Related U.S. Application Data

(63) Continuation of application No. PCT/EP2018/052186, filed on Jan. 30, 2018.

(30) Foreign Application Priority Data

Feb. 9, 2017 (DE) .......................... 102017001226.1

(51) Int. Cl.
*B65G 43/08* (2006.01)
*B65G 13/11* (2006.01)
(Continued)

(52) U.S. Cl.
CPC .............. *B65G 43/08* (2013.01); *B65G 13/11* (2013.01); *B65G 17/067* (2013.01); *B65G 21/22* (2013.01);
(Continued)

(58) Field of Classification Search
CPC ...... B65G 43/08; B65G 17/067; B65G 21/22; B65G 2203/0258; B65G 39/20; G01G 11/04; G01G 11/003
See application file for complete search history.

(56) References Cited

U.S. PATENT DOCUMENTS 5,306,877 A * 4/1994 Tas ............................ B07C 5/18
209/912
6,803,529 B2 10/2004 Takahashi
(Continued)

FOREIGN PATENT DOCUMENTS

CN 1372633 A 10/2002
CN 201464007 U 5/2010
(Continued)

OTHER PUBLICATIONS

Chinese Office Action dated Oct. 26, 2020 in corresponding application 201880010992.2.
(Continued)

*Primary Examiner* — Mark A Deuble

(74) *Attorney, Agent, or Firm* — Muncy, Geissler, Olds & Lowe, P.C.

(57) ABSTRACT

A conveying and metering device with an endless apron belt that is movable by rollers on guide rails, wherein sections of the guide rail that are opposite one another are separated from the adjacent sections and, for determining the mass of the conveyed material, are supported on weighing devices that are connected to an electronic analysis device. Provision is made that the sections of the guide rail to be weighed, together with longitudinal members and transverse struts that are perpendicular to the longitudinal members, form a weighing frame, and this weighing frame is supported at each of its four corners on a separate weighing device, wherein an adjustable centering device is provided between the weighing frame and each of the weighing devices.

12 Claims, 5 Drawing Sheets

(51) Int. Cl.
*B65G 17/06* (2006.01)
*B65G 21/22* (2006.01)
*B65G 39/16* (2006.01)
*B65G 47/22* (2006.01)
*G01G 11/04* (2006.01)

(52) U.S. Cl.
CPC ............ *B65G 39/16* (2013.01); *B65G 47/22* (2013.01); *G01G 11/04* (2013.01)

(56) References Cited

U.S. PATENT DOCUMENTS

| | | | |
|---|---|---|---|
| 6,958,452 B2 | 10/2005 | Takahashi | |
| 9,834,386 B2 | 12/2017 | Halbritter | |
| 10,308,343 B2* | 6/2019 | Firko | B64C 1/064 |
| 10,999,858 B2* | 5/2021 | Gupta | H04L 1/1614 |
| 11,002,590 B2* | 5/2021 | Stronkhorst | G01G 11/003 |

FOREIGN PATENT DOCUMENTS

| | | |
|---|---|---|
| CN | 205661981 U | 10/2016 |
| DE | 1456699 A1 | 4/1969 |
| DE | 4103815 A1 | 5/1992 |
| DE | 202014007282 U1 | 12/2015 |
| EP | 0772028 A2 | 5/1997 |
| GB | 1195058 | 6/1970 |

OTHER PUBLICATIONS

International Search Report dated May 15, 2018 in corresponding application PCT/EP2018/052186.

* cited by examiner

CONVEYING AND METERING DEVICE

This nonprovisional application is a continuation of International Application No. PCT/EP2018/052186, which was filed on Jan. 30, 2018, and which claims priority to German Patent Application No. 10 2017 001 226.1, which was filed in Germany on Feb. 9, 2017, and which are both herein incorporated by reference.

BACKGROUND OF THE INVENTION

Field of the Invention

The present invention relates to a conveying and metering device.

Description of the Background Art

Apron belts or apron belt conveyors are known from the prior art. They are used to convey bulk materials of all types in order to feed these materials as evenly as possible to mills, drying devices, or crushers.

Known from DE 1 456 699 A1, for example, is an apron belt conveyor in which the guide rail is divided and each section of the guide rail to be weighed is supported on at least one weighing device. Because it is fundamentally important with weighing devices in the form of load cells to ensure that application of the load is centered in the direction of the measurement direction of the load cell, since otherwise measurement inaccuracies or destruction of the load cell are to be expected, complex guide rod devices are arranged in the region of the weighing devices for the apron belt conveyor. Their use is intended to prevent horizontal forces due to belt tracking or due to temperature effects from causing measurement errors.

In addition, an apron belt conveyor is known from EP 0772 028 A1 in which a part of the guide rail is implemented as a weighing rail to which strain gauges are applied so that the rollers of the apron belt run directly along the weighing rail, and therefore the weight force of the material to be weighed can be sensed on the apron belt. However, because the weighing rail must have a certain length made of load cell steel and be machined to fit precisely, this embodiment is very expensive.

SUMMARY OF THE INVENTION

It is therefore an object of the present invention to avoid, or at least to mitigate, the disadvantages of the prior art. In particular, the intent is for the forces due to the weight of the apron belt to be applied to the weighing devices without constraining forces or force bypasses in order to obtain the most accurate and error-free measurement results possible, so that the metering of the material being conveyed can occur as accurately as possible.

In an exemplary embodiment, a conveying and metering device according to the invention includes an endless apron belt that is movable by means of rollers on guide rails. The apron belt usually has sheet steel plates, which rest on or in front of one another in the manner of scales. The sheet steel plates, so-called buckle plates, are connected to one another by chains that make it possible for the sheet steel plates to circulate around a drive and guide roller. To this end, the rollers, which have a wheel flange and a running surface, are attached to the underside of the sheet steel plates, which run along the guide rails provided for this purpose.

For the purpose of determining the mass of the transported material being conveyed, sections of the guide rail that are opposite one another are separated from the adjacent sections and, for determining the mass of the conveyed material, are supported on weighing devices that are connected to an electronic analysis device. The electronic analysis device includes weighing electronics and corresponding control electronics so that the mass of the conveyed material can be determined and metered. For this purpose, after the mass and belt speed have been determined, the actual flow rate is calculated and compared with a desired target flow rate. The metering then takes place through the regulation of the conveying speed of the conveying device. The speed of the conveying device or of the apron belt is regulated by means of a variable-speed drive.

In this design, the sections of the guide rail to be weighed, so-called weighing rails, form a weighing frame together with longitudinal members and with transverse struts that are perpendicular to the guide rails and to the longitudinal members. This weighing frame is located directly below the plane of the apron belt, and is supported at each of its four corners on a separate weighing device. The weighing devices are provided in the form of load cells, weighbeams, or weighing sensors, so-called force transducers, whose signals are analyzed by weighing electronics or analysis electronics.

The support of the weighing platform is thus statically indeterminate. The division of the load from the rollers and the apron belt among all force transducers should therefore be distributed uniformly. This normally can only be achieved at installation. Consequently, the solution according to the invention provides a connection of the guide rails and their associated longitudinal members with the cross members to form a weighing frame, so that the vertical forces acting on the guide rails can be applied uniformly and centrally to the weighing devices, and thus exactly in the measurement direction of the weighing devices. In addition, an adjustable centering device is arranged between the weighing frame and each of the weighing devices. Consequently, the weighing frame can be matched to the existing substructure and the other guide rails so that misalignments between guide rail and weighing rail do not occur. The adjustment with the aid of the centering device can take place in the conveying direction x, at right angles to the conveying direction y, and in the vertical direction z in this case.

The weighing frame is advantageously designed to be torsionally soft and flexurally soft. This means that the weighing frame can be matched to the conditions of the substructure during installation, so that the section of the guide rails to be weighed, the so-called weighing rail, and the other sections of the guide rails can be matched to one another exactly. Misalignments that could lead to impacts of the rollers at the transition points, and consequently to adverse effects on the measurement result, can be avoided in this way.

An embodiment of the invention provides that cantilever springs in the form of leaf springs with a rectangular cross section are provided on the weighing frame for load application of the vertical loads to the weighing devices and/or for adjustment of the weighing frame. In this way, the load application elements of the weighing frame are defined exactly in relation to the weighing devices. Advantageously, first cantilever springs are provided in the form of transverse struts of the weighing frame or as extensions of the transverse struts of the weighing frame and are arranged with regard to their rectangular cross section such that their planar moment of inertia, and thus their flexural stiffness, is high with respect to loading and deflection in the vertical direction and low with respect to loading and deflection in the conveying direction.

Each centering device can have three degrees of freedom with respect to the support of the weighing frame. Accordingly, each centering device can be moved or adjusted with regard to the support of the weighing frame in the X-direction, which is to say in the conveying direction, in the Y-direction, which is to say at right angles to the conveying direction, and in the Z-direction, which is to say in the vertical direction, so that it has three translational degrees of freedom.

The centering device for vertical adjustment of the weighing frame can include a rocker with a pivot point, a load arm, and a force arm, wherein a first cantilever spring of the weighing platform or of the frame rests on the load arm of each rocker. Advantageously, a lever travel of the force arm of the rocker in the Z-direction or vertical direction can be variably adjusted through a screw.

For adjustment of the weighing frame in the conveying direction or at right angles to the conveying direction, the first cantilever spring can be supported in a freely movable manner on the centering device or the weighing device.

In addition, a seat and/or a stop for a second leaf spring of the weighing frame can be provided on the centering device. In this case, the second leaf spring is arranged to be perpendicular to the direction of the first leaf spring on the weighing frame.

The second leaf spring of the weighing frame can be likewise supported in the centering device so as to be movable in the conveying direction x. The movement range in the conveying direction x is limited by a stop on the centering device, however.

Furthermore, the second leaf spring of the weighing frame can be supported in the seat of the centering device under preloading. Advantageously, the preloading of the second leaf spring acts at right angles to the conveying direction in this case.

The vertical application of load from the weighing frame can take place through a centering device that includes at least one self-aligning pressure piece. The load cells then take the form of a pendulum support or a self-aligning bearing, so that when horizontal forces arise, a horizontal deflection of the load cell is achieved without measurement error. Self-centering elastomer bearings can be used as another alternative. Appropriate stops, buffers, or elastomer bearings are provided in order to avoid horizontal disturbing forces resulting from temperature effects and vibrations resulting from belt tracking, which could lead to destruction of the weighing devices.

An adjustable overload protection device can be provided between substructure and weighing device. This device is likewise provided with a screw so that a height adjustment can also be undertaken here during installation of the weighing frame.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The figures are schematic in nature and are intended solely for understanding of the invention. Like elements are labeled with the same reference symbols.

Figure 1:
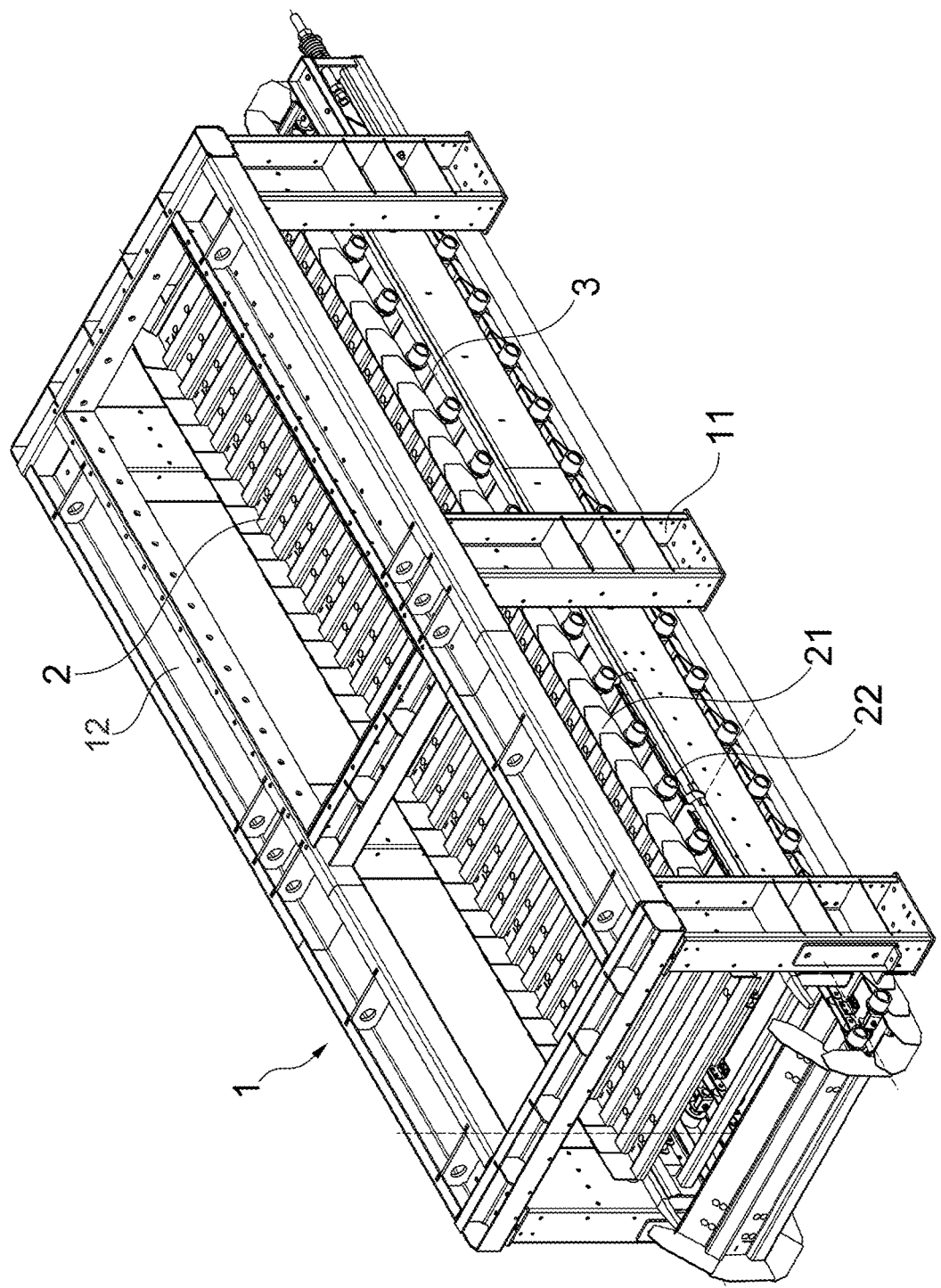
FIG. 1 shows a conveying device in the form of an apron weigh feeder according to the prior art.

FIG. 1 shows an apron belt conveyor with a substructure 1 having supports 11 made of sheet steel, on which is arranged an endless apron belt 2 that runs around a drive and guide roller. Attached to the buckle plates 21 of the apron belt 2 that are connected to one another by chains are bearing rollers 22, which circulate on one or more guide rails 3 synchronously with the apron belt 2.

Figure 2:
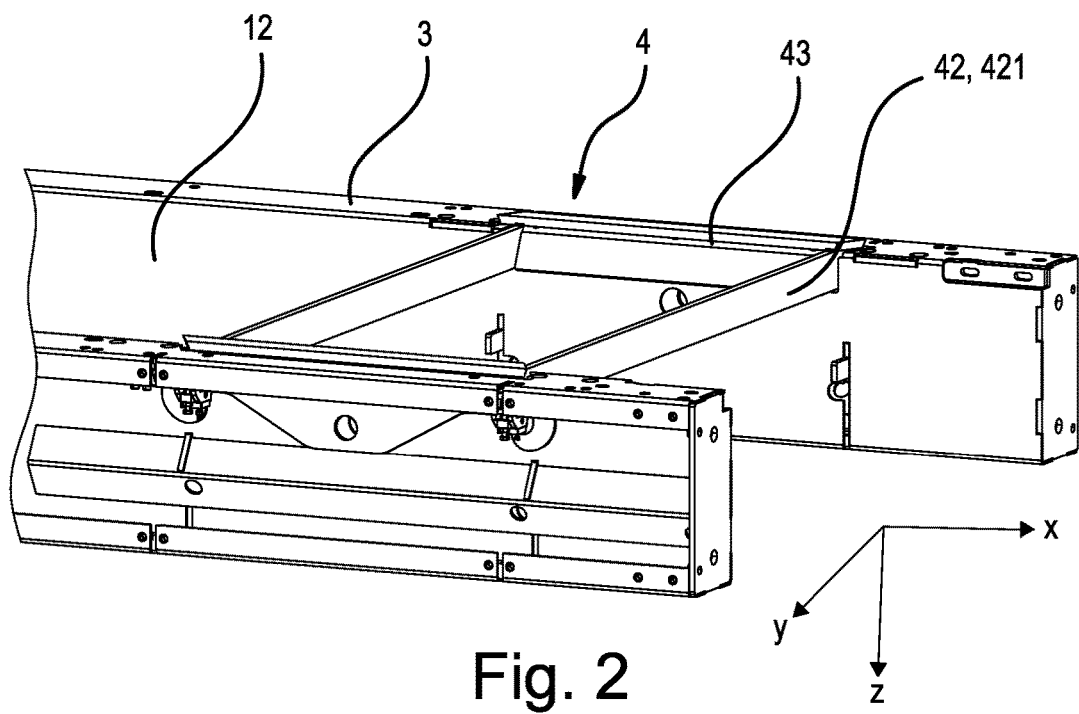
FIG. 2 is a perspective view of a part of a conveying and metering device according to the invention with integrated weighing frame.

In contrast thereto, FIG. 2 shows a perspective view of a part of a conveying and metering device according to the invention with integrated weighing frame 4. As is evident from the drawing, the base frame is cut out or the frame brackets 12 of the substructure 1, which are made of folded steel sheets, are cut out in such a way that the weighing frame 4, which is made of sections of the guide rail to be weighed, the so-called weighing rails 43, and of the longitudinal members 41 connected thereto as well as transverse struts 42, can be inserted into the frame brackets 12 on both sides. In this design, the weighing frame 4 is supported on four weighing devices 6 in the form of force transducers. The weighing frame 4 thus constitutes a type of platform scale.

In this design, care should be taken that all edges of the weighing rails 43 align with the other guide rails 3 and that the gap dimensions between weighing frame 4 and guide rails 3 are within the permissible tolerances. On the other hand, the gaps between weighing rail 43 and guide rail 3 must be large enough that no dirt can accumulate there. The rail joint that is cut free thus minimizes frictional connections between guide rails 3 and weighing rail 43.

Because the weighing frame 4 is thus supported in a statically indeterminate manner, it is important to ensure during installation that the weighing devices 6 are uniformly loaded and that no constraining forces arise. For this reason, the weighing frame 4 is provided in the form of a flexurally soft and torsionally soft frame that can be matched to the conditions of the substructure. The vertical loads resulting from loading by the apron belt 2 and the material being conveyed are conducted by means of cantilever springs 411, 421 from the weighing frame 4 through adjustable centering devices 5 to the weighing devices 6.

The region of influence on the weighing frame 4 is larger here than the actual measurement region, which is defined by the area of the apron belt 2 in the region of the weighing frame 4. Possible disruptions from the mechanical system, for example due to a jammed buckle plate 21, affect the weight sensing even when this disruption is not located in the measurement region. Consequently it is important that the rollers 22 run horizontally straight over the region of influence of the weighing frame 4 and that the wheel flanges of the rollers 22 do not scrape laterally against the guide rails or strike them.

The guide rails 3 and weighing rails 43 must therefore align precisely with one another in the horizontal direction in order to apply the measurement load correctly to the weighing device 6.

A weighing electronics unit senses the electrical signals determined with the weighing devices and senses the apron belt speed, calculates the measurement load, and determines the actual flow rate therefrom.

Figure 3:
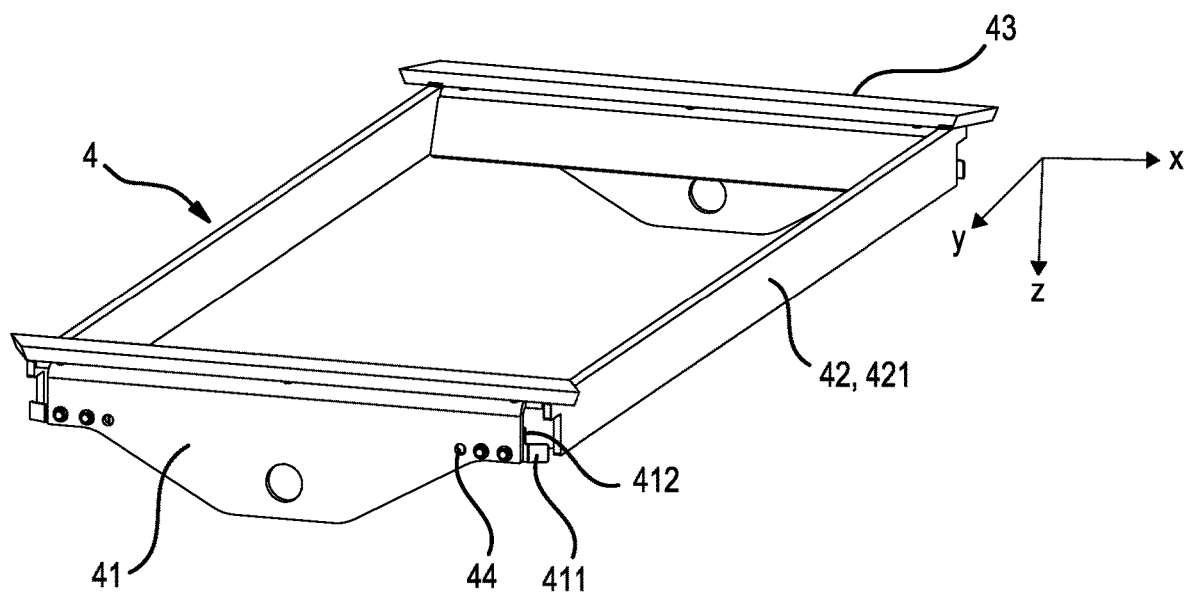
FIG. 3 is a perspective view of the weighing frame from FIG. 2.
Figure 4:
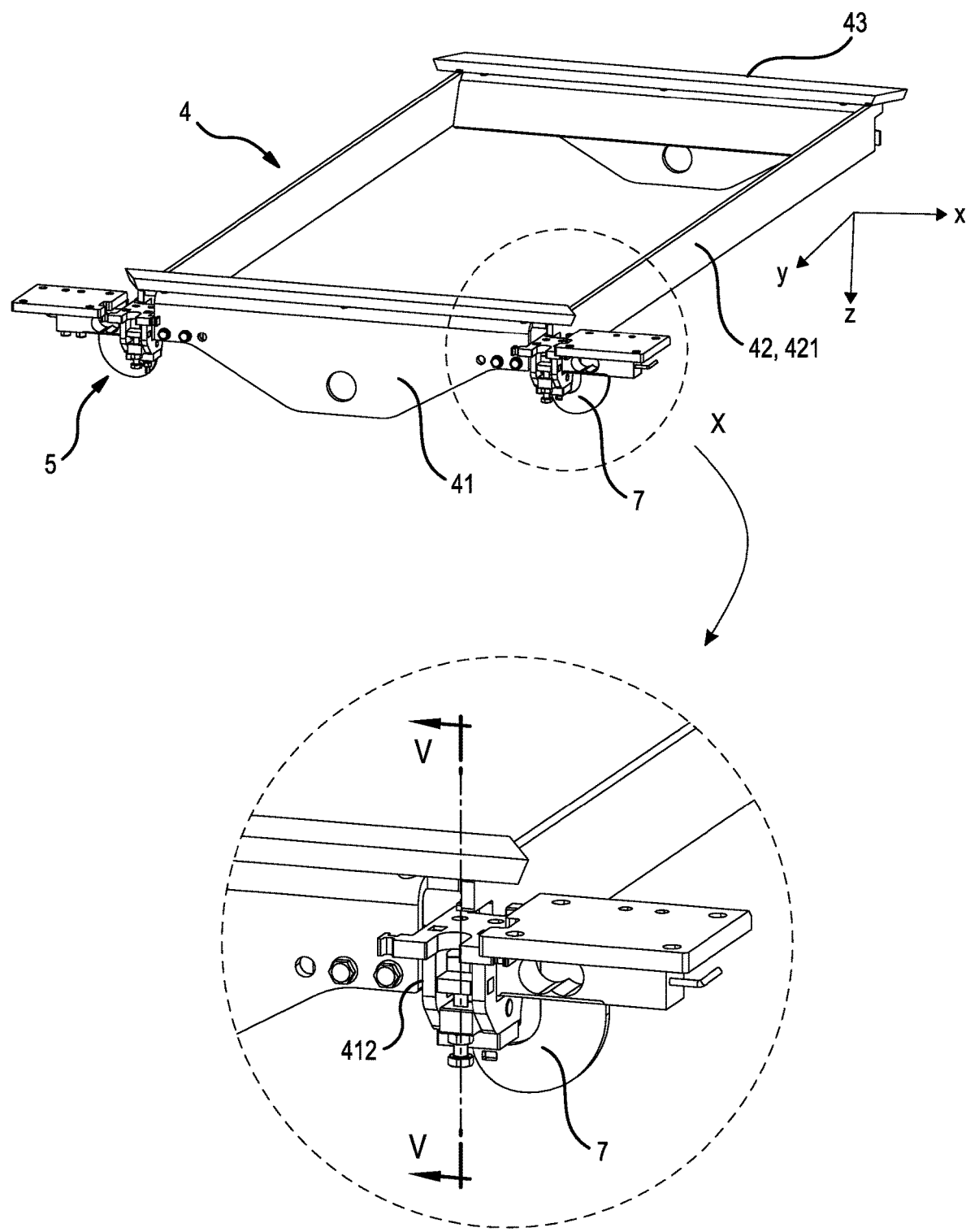
FIG. 4 is a perspective view of the weighing frame from FIG. 2 and FIG. 3 with two centering devices.

It can be seen from FIG. 3 that the transverse strut 42 in this exemplary embodiment has a rectangular cross section, and thus as a whole serves as the first cantilever spring 421. In an alternative embodiment of the transverse strut, for example in the form of an I-beam or T-beam, the profile in the support region of the centering device 5 would be reduced to the web of the profile in order to once again obtain a rectangular cross section and a cantilever spring. During installation of the weighing frame 4 in the frame brackets of the base frame or of the substructure 3, it is important to ensure that the weighing frame 4 is supported in the base frame so as to be exactly centered. For this purpose, a second cantilever spring 411 is screwed onto the longitudinal member 41 of the weighing frame 4. This spring has a defined preloading, is supported in a seat 53 of the centering device 5, and thus centers the complete weighing frame 4 at right angles to the conveying direction between the four centering devices. In this design, the distance between a centering device 5 and a longitudinal frame 41 of the weighing frame 4 is adjustable through spacer plates. The ability of the weighing frame 4 to move in the conveying direction x remains unaffected thereby, however, since the first cantilever spring 421 is mounted on the centering device 5 with clearance in the conveying direction x.

The weighing frame 4 should be placed into the base frame edge to edge with the centering device 5 in the conveying direction x of the apron belt 2. For this purpose, the weighing frame 4 has appropriate mounting holes 44, by means of which the weighing frame 4 resting on the centering device 5 can be moved in the conveying direction x or opposite this direction. As soon as a stop 412 of the second cantilever spring 411 provided for this purpose interacts with a corresponding abutting cue stop 54 of the centering device 5, the weighing frame 4 is adjusted, and the desired gap dimensions between guide rails 3 and weighing rail 43 are set.

Figure 5:
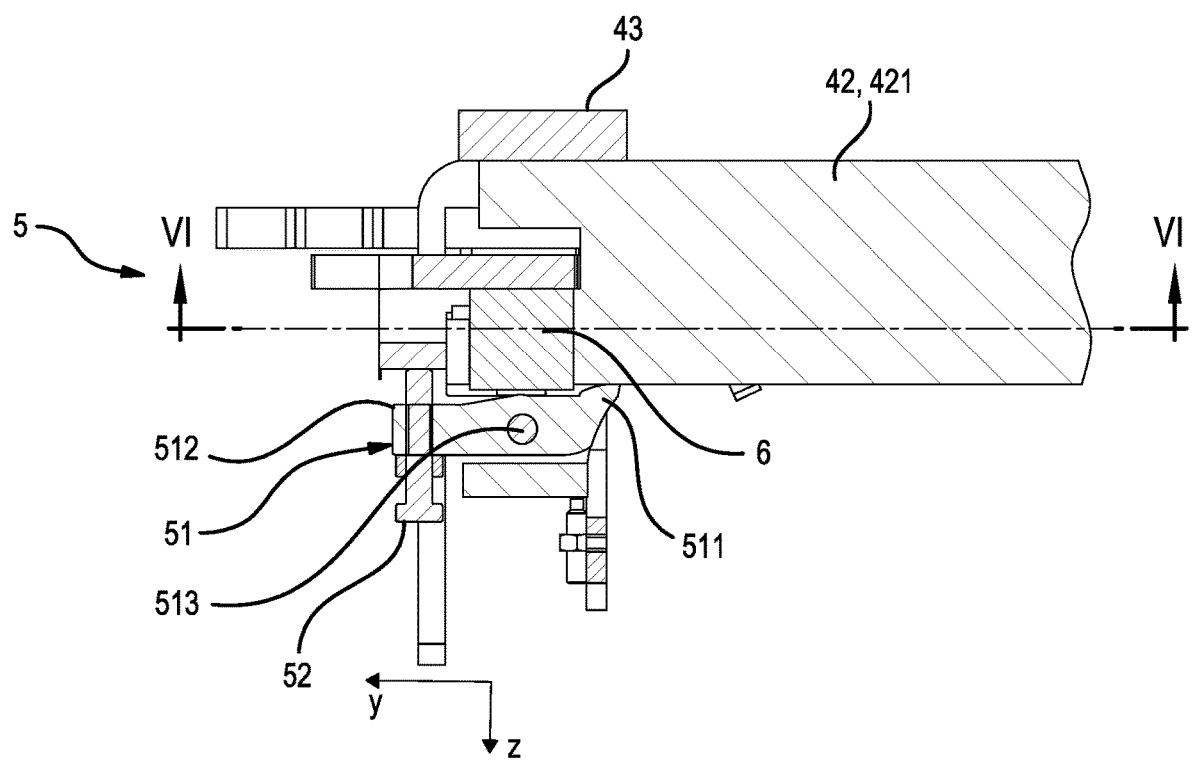
FIG. 5 is a cross section through the weighing frame and the centering device from FIG. 4 along the line V-V.
Figure 6:
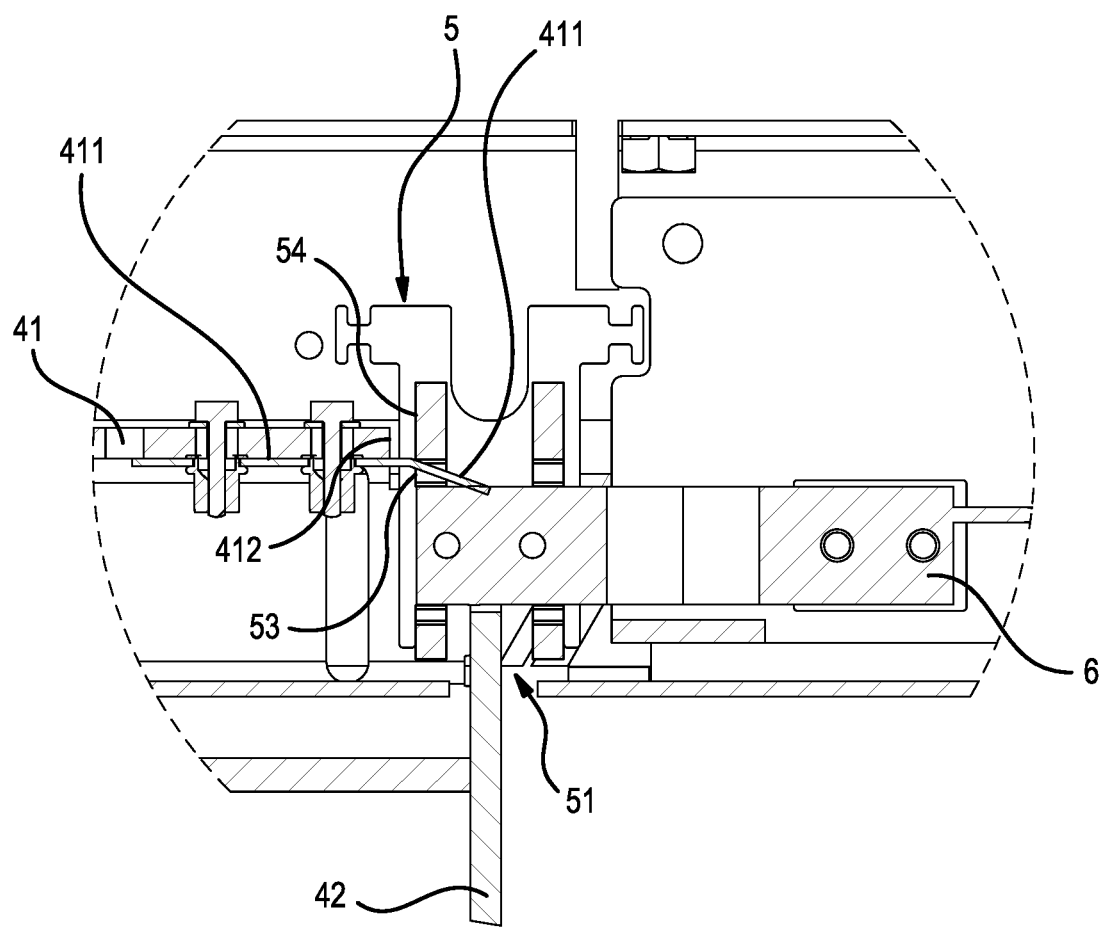
FIG. 6 is a cross section through the weighing frame and the centering device from FIG. 5 along the line VI-VI.

It is clear from FIG. 5 that the weighing frame 4 can also be adjusted in terms of its height in relation to the base frame of the substructure 3 by means of the four centering devices 5. For this purpose, the first cantilever spring 421 or the cross frame rests on a load arm 511 of a rocker 51. This rocker 51 has its pivot point 513 below the weighing device 6 so that the deflection of the load arm 511 can be adjusted in the vertical direction z through a screw 52 that extends through a force arm 512 of the rocker 51. The height of the weighing frame 4 and of the weighing rail 43 relative to the guide rail 3 is adjusted by lowering or raising the load arm 511. Installation of the weighing frame 4 with an increased height of the weighing rail 43 as compared to the guide rail 3 in the range of tenths of millimeters is thus possible by means of the adjustable centering device 5. With the aid of a suitable increased height, the empty weight of the apron belt 2 can be compensated for during use, so that height offsets at the abutting edges of weighing rail 43 and guide rails 3 do not occur during use of the conveying device. As a result, the measurement load is once again applied to the weighing devices 6 without vibrations.

Weighing devices 6 that can be loaded off-center like a platform scale are employed advantageously. The corresponding rated load of the weighing device 6 can be matched to the conveying device for each use case.

So that a maximum load value per weighing device 6 is maintained, thus protecting the device from overloading and destruction, an overload protection device 7 is installed between the centering device 5 and a mounting plate on the base frame of the substructure 3. The maximum load value here is defined through the permissible deformation/displacement in the vertical direction as a result of the load on the weighing frame 4. The corresponding travel of the overload protection device 7, which is provided in the form of disk, can likewise be defined through a screw.

On the whole, it is clear that the conveying and metering device according to the invention, with the corresponding weighing frame 4 and the associated centering devices 5, offers the possibility of using inexpensive standard force transducers for determining the flow rate. As a result of the fact that the weighing rails 43 can be matched to the existing guide rails 3 of the base frame by means of the centering devices 5, exact measurement results are provided without interfering influences due to force bypasses, impacts, or other interfering factors.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A conveying and metering device comprising:
   an endless apron belt that is movable via rollers on guide rails;
   sections of the guide rails that are opposite one another are separated from adjacent sections and, for determining a mass of conveyed material, are supported on weighing devices,
   wherein the sections of the guide rail to be weighed, together with longitudinal members and transverse struts that are perpendicular to the longitudinal members, form a weighing frame, wherein each corner of the weighing frame is supported on a separate one of the weighing devices, and
   wherein an adjustable centering device is provided at each corner of the weighing frame to adjust a position of the weighing frame.

2. The conveying and metering device according to claim 1, wherein the weighing frame is designed as a torsionally soft and flexurally soft frame.

3. The conveying and metering device according to claim 1, wherein, for load application of vertical loads to the weighing devices or centering device and/or for adjustment of the weighing frame, cantilever springs are provided thereon in the form of leaf springs with a rectangular cross section.

4. The conveying and metering device according to claim 1, wherein at least one centering device has three degrees of freedom with respect to the support of the weighing frame.

5. The conveying and metering device according to claim 1, wherein the centering device has, with respect to the support of the weighing frame, three translational degrees of freedom x, y, z in a conveying direction, at right angles to the conveying direction, and in a vertical direction.

6. The conveying and metering device according to claim 1, wherein the centering device includes a rocker with a pivot point, a load arm, and a force arm, wherein a first cantilever spring of the weighing frame rests on the load arm of each rocker.

7. The conveying and metering device according to claim 6, wherein a lever travel of the force arm is variably adjustable in a vertical direction through a screw.

8. The conveying and metering device according to claim 6, wherein the first cantilever spring of the weighing frame is supported on the centering device or the weighing device in a freely movable manner in a conveying direction and/or at right angles to the conveying direction.

9. The conveying and metering device according to claim 6, wherein a seat and/or a stop for a second cantilever spring of the weighing frame is provided on the centering device.

10. The conveying and metering device according to claim 9, wherein the second cantilever spring of the weighing frame is supported in the centering device so as to be movable in the conveying direction.

11. The conveying and metering device according to claim 9, wherein the second cantilever spring of the weighing frame is supported in the seat of the centering device under preloading.

12. The conveying and metering device according to claim 1, wherein an adjustable overload protection device is provided at each corner of the weighing frame adjacent to the centering device.

* * * * *